H. C. BENSON.
COMBINED RUBBER ERASER HOLDER AND POINT PROTECTORS.
No. 174,466.  Patented March 7, 1876.
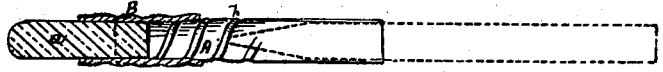
Witnesses:  Inventor:

UNITED STATES PATENT OFFICE.

HENRY C. BENSON, OF YONKERS, ASSIGNOR TO JOSEPH RECKENDORFER, OF NEW YORK, N. Y.

IMPROVEMENT IN COMBINED RUBBER-ERASER HOLDERS AND POINT-PROTECTORS.

Specification forming part of Letters Patent No. 174,466, dated March 7, 1876; application filed December 7, 1875.

*To all whom it may concern:*

Be it known that I, HENRY C. BENSON, of Yonkers, in the State of New York, have invented certain new and useful Improvements in Combined Rubber-Eraser Holders and Point-Protectors, of which the following is a specification:

My invention relates to a pencil-point protector, which carries at one end a rubber eraser; and it consists in the combination, with the point-protecting tube provided with a rubber eraser and screw-threaded at the rubber end, of a correspondingly screw-threaded sleeve (screw-threaded for the whole or a portion of its length) encompassing and engaging the screw-threaded part of the tube, and movable thereon. Under this arrangement the sleeve serves to protect the rubber when the same is not in use. It can be screwed up or down to uncover more or less of the rubber, and it will maintain itself in any position to which it may be adjusted.

The manner in which my invention is or may be carried into effect will be understood by reference to the accompanying drawing, in which—

Figure 1 is an elevation, and Fig. 2 is a longitudinal central section, of a device embodying my invention.

A is the point-protecting tube formed at one end in the usual manner to admit of the insertion of the pencil, as indicated in Fig. 2, in which the pencil is represented by dotted lines.

In the other end of the tube is fixed the rubber or erasive material *a*. This portion of the tube is formed with a spiral or screw thread, *b*, either indented or raised on the tube. Encircling the tube is a sleeve, B, which is formed with a corresponding screw-thread to engage that on the point-protecting tube.

Under this arrangement the sleeve can be moved in one direction or the other by simply rotating it, the direction in which it moves being determined by the direction in which it is turned. Thus more or less of the rubber can be exposed, as desired, and the rubber, when not in use, can be entirely covered and protected.

It will be noted that the adjustable sleeve fits around the stick of rubber or erasive material as well as the point-protecting tube. It thus affords a support for the eraser, and allows the latter to be made of much greater length than heretofore practicable. Only so much of the rubber as is needed for erasing purposes need be exposed at any time. The rest of it is encircled and protected by the sleeve, which also gives it the support and stiffness requisite to the proper use of the exposed portion.

I do not here claim, broadly, the combination, with a point-protecting tube, of a sleeve movable thereon, for the purpose of covering or uncovering more or less of the rubber eraser. This feature forms the subject of a separate application in my name now pending in the United States Patent Office.

I claim as my invention—

The point-protecting tube provided with a rubber eraser, and screw-threaded, as described, in combination with a correspondingly screw-threaded sleeve, encompassing and engaging the tube, and movable thereon, substantially as and for the purposes set forth.

In testimony whereof, I have hereunto signed my name this 4th day of December, A. D. 1875.

HENRY C. BENSON.

Witnesses:
 LEOPOLD ANSBACHER.
 SAMUEL KRAUS.